(12) United States Patent
Jensen et al.

(10) Patent No.: US 7,654,084 B2
(45) Date of Patent: *Feb. 2, 2010

(54) METERING FUEL PUMP

(75) Inventors: Eric Jensen, Bedford, NH (US);
Christopher C. Langenfeld, Nashua, NH (US); Scott Newell, Ipswich, MA (US); Michael Norris, Manchester, NH (US); Jeffrey D. Renk, Goffstown, NH (US); Andrew Schnellinger, North Andover, MA (US)

(73) Assignee: New Power Concepts LLC, Manchester, NH (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/534,979

(22) Filed: Sep. 25, 2006

(65) Prior Publication Data
US 2007/0028612 A1 Feb. 8, 2007

Related U.S. Application Data

(60) Continuation of application No. 10/643,147, filed on Aug. 18, 2003, now Pat. No. 7,111,460, which is a continuation-in-part of application No. 09/853,239, filed on May 11, 2001, now Pat. No. 6,705,081, which is a continuation-in-part of application No. 09/517,686, filed on Mar. 2, 2000, now Pat. No. 6,247,310, said application No. 10/643,147 is a continuation-in-part of application No. 10/361,354, filed on Feb. 10, 2003, now Pat. No. 6,857,260, which is a division of application No. 09/883,077, filed on Jun. 15, 2001, now Pat. No. 6,543,215.

(51) Int. Cl.
*F01B 29/10* (2006.01)

(52) U.S. Cl. .......................................... 60/524; 60/517

(58) Field of Classification Search ................... 60/517, 60/520, 524, 526
See application file for complete search history.

(56) References Cited

U.S. PATENT DOCUMENTS 55,516 A 6/1866 Winans et al.

(Continued)

FOREIGN PATENT DOCUMENTS

DE 445033 5/1927

(Continued)

OTHER PUBLICATIONS

Eder, F., *Apparatus for Heat Transfer at Elevated Temperature, to the Working Medium of a Regenerative Thermal Engine (or "energy engine")*, Jun. 15, 1992, 20 pages.

(Continued)

*Primary Examiner*—Hoang M Nguyen
(74) *Attorney, Agent, or Firm*—Michelle Saquet Temple

(57) ABSTRACT

A device and method for controlling the flow of a gaseous fuel from a fuel supply to a pressurized combustion chamber. A fuel pump is included in the gas train from supply to chamber. The fuel pump increases the pressure of the gas to allow efficient injection into the chamber. The pump is modulated to control the fuel flow. Both alternating current and pulse-width-modulated direct current signals may be used to control the flow. The pump may be a piston pump or a diaphragm pump. Feedback may be provided from sensors that determine operating parameters of the engine and such sensor signals may be used by the controller to maintain a parameter, such as temperature, at a specified value. An acoustic filter can be included in the gas train to significantly reduce gas flow pulsations generated by the pump. This filter improves the uniformity of the combustion process.

20 Claims, 7 Drawing Sheets

U.S. PATENT DOCUMENTS

| | | |
|---|---|---|
| 120,222 A | 10/1871 | Van Emon |
| 124,805 A | 3/1872 | Fryer |
| 321,313 A | 6/1885 | Pinkham |
| 488,373 A | 12/1892 | Touch |
| 646,406 A | 4/1900 | Anderson et al. |
| 1,089,651 A | 3/1914 | Kovalavich |
| 1,769,375 A | 7/1930 | Leary |
| 1,831,574 A | 11/1931 | Norton |
| 1,840,389 A | 1/1932 | Eubank |
| 1,866,702 A | 7/1932 | Gehres |
| 2,170,099 A | 8/1939 | Stubings |
| 2,176,657 A | 10/1939 | Finch |
| 2,289,984 A | 7/1942 | Mouromtseff et al. |
| 2,337,294 A | 12/1943 | Cooper |
| 2,419,234 A | 4/1947 | Holihan |
| 2,564,100 A | 8/1951 | Du Pre |
| 2,595,457 A | 5/1952 | Holm et al. |
| 2,688,228 A | 9/1954 | De Brey et al. |
| 3,059,418 A | 10/1962 | Johnston |
| 3,293,480 A | 12/1966 | Green et al. |
| 3,431,788 A | 3/1969 | Du Pre et al. |
| 3,651,641 A * | 3/1972 | Ginter ................ 60/39.26 |
| 3,742,578 A | 7/1973 | Dirne et al. |
| 3,775,973 A | 12/1973 | Hudson |
| 3,782,120 A * | 1/1974 | Brandenburg ................ 60/524 |
| 3,782,457 A | 1/1974 | Troy |
| 3,860,384 A | 1/1975 | Vulliet et al. |
| 3,861,223 A | 1/1975 | Braun |
| 3,924,477 A | 12/1975 | Portelance |
| 3,940,933 A | 3/1976 | Nystrom |
| 3,956,892 A | 5/1976 | Nystrom |
| 4,008,039 A | 2/1977 | Compton et al. |
| 4,020,635 A | 5/1977 | Joynes et al. |
| 4,041,592 A | 8/1977 | Kelm |
| 4,067,191 A | 1/1978 | Gronvall et al. |
| 4,085,588 A | 4/1978 | Reams et al. |
| 4,169,692 A | 10/1979 | McDonough et al. |
| 4,172,363 A | 10/1979 | Bex |
| 4,191,241 A | 3/1980 | Brennan |
| 4,231,222 A * | 11/1980 | Fenton ................ 60/524 |
| 4,305,457 A | 12/1981 | Cozzolino |
| 4,313,080 A | 1/1982 | Park |
| 4,330,260 A | 5/1982 | Jorgensen et al. |
| 4,330,992 A | 5/1982 | Senft |
| 4,343,350 A | 8/1982 | Campbell et al. |
| 4,364,724 A | 12/1982 | Alpkvist |
| 4,384,457 A | 5/1983 | Harvey |
| 4,387,568 A | 6/1983 | Dineen |
| 4,413,475 A | 11/1983 | Moscrip |
| 4,416,114 A | 11/1983 | Martini |
| 4,434,617 A | 3/1984 | Walsh |
| 4,442,670 A | 4/1984 | Goldman |
| 4,445,570 A | 5/1984 | Retallick |
| 4,511,805 A | 4/1985 | Boy-Marcotte et al. |
| 4,527,394 A | 7/1985 | Corey |
| 4,538,677 A | 9/1985 | Bodas et al. |
| 4,573,320 A | 3/1986 | Kralick |
| 4,633,667 A | 1/1987 | Watanabe et al. |
| 4,638,633 A | 1/1987 | Otters |
| 4,662,176 A | 5/1987 | Fujiwara et al. |
| 4,676,202 A | 6/1987 | Johnson |
| 4,736,586 A | 4/1988 | Kawajiri et al. |
| 4,768,341 A | 9/1988 | Nozaki et al. |
| 4,824,149 A | 4/1989 | Reuchlein |
| 4,881,372 A | 11/1989 | Naito |
| 4,898,041 A | 2/1990 | Islas |
| 4,901,790 A | 2/1990 | Maijer |
| 4,977,742 A | 12/1990 | Meijer |
| 4,996,841 A | 3/1991 | Meijer et al. |
| 5,003,777 A | 4/1991 | Berchowitz |
| 5,005,349 A | 4/1991 | Momose et al. |
| 5,065,579 A | 11/1991 | Monahan |
| 5,074,114 A | 12/1991 | Meijer et al. |
| 5,095,701 A | 3/1992 | Nakano |
| 5,148,066 A | 9/1992 | Beale et al. |
| 5,172,784 A | 12/1992 | Varela, Jr. |
| 5,174,117 A | 12/1992 | Naito et al. |
| 5,199,722 A | 4/1993 | Wada et al. |
| 5,203,170 A | 4/1993 | Naito |
| 5,228,293 A | 7/1993 | Vitale |
| 5,293,853 A * | 3/1994 | Berger et al. ................ 123/357 |
| 5,441,401 A | 8/1995 | Yamaguro et al. |
| 5,459,812 A | 10/1995 | Taylor |
| 5,494,135 A | 2/1996 | Brackett |
| 5,522,214 A | 6/1996 | Beckett et al. |
| 5,590,526 A | 1/1997 | Cho |
| 5,590,626 A | 1/1997 | Hitomi et al. |
| 5,596,262 A | 1/1997 | Boll |
| 5,642,618 A | 7/1997 | Pennswick |
| 5,675,974 A | 10/1997 | Heikrodt et al. |
| 5,697,430 A | 12/1997 | Thors et al. |
| 5,701,965 A | 12/1997 | Kamen et al. |
| 5,735,681 A | 4/1998 | Cheng |
| 5,743,091 A | 4/1998 | Penswick et al. |
| 5,755,100 A | 5/1998 | Lamos |
| 5,761,985 A | 6/1998 | Stoll |
| 5,771,694 A | 6/1998 | Houtman et al. |
| 5,786,640 A | 7/1998 | Sakai et al. |
| 5,804,947 A | 9/1998 | Nii et al. |
| 5,864,770 A | 1/1999 | Ziph et al. |
| 5,875,863 A | 3/1999 | Jarvis et al. |
| 5,878,570 A | 3/1999 | Reithofer |
| 5,881,800 A | 3/1999 | Chung |
| 5,920,133 A | 7/1999 | Penswick et al. |
| 5,921,764 A | 7/1999 | Marchionna et al. |
| 5,929,538 A | 7/1999 | O'Sullivan et al. |
| 5,945,808 A | 8/1999 | Kikuchi et al. |
| 5,952,813 A | 9/1999 | Ochiai |
| 5,954,039 A | 9/1999 | Doering et al. |
| 5,971,091 A | 10/1999 | Kamen et al. |
| 6,050,092 A | 4/2000 | Genstler et al. |
| 6,062,023 A | 5/2000 | Kerwin et al. |
| 6,094,912 A | 8/2000 | Williford |
| 6,161,381 A | 12/2000 | Lohrmann |
| 6,161,610 A | 12/2000 | Azar |
| 6,247,310 B1 | 6/2001 | Norris et al. |
| 6,253,550 B1 | 7/2001 | Langenfeld et al. |
| 6,347,453 B1 | 2/2002 | Mitchell |
| 6,380,637 B1 | 4/2002 | Hsu et al. |
| 6,381,958 B1 | 5/2002 | Kamen et al. |
| 6,543,215 B2 | 4/2003 | Langenfeld et al. |
| 7,111,460 B2 * | 9/2006 | Jensen et al. ................ 60/520 |
| 2001/0042373 A1 | 11/2001 | Bliesner et al. |

FOREIGN PATENT DOCUMENTS

| | | |
|---|---|---|
| DE | 1528714 | 3/1977 |
| DE | 35 00 124 A1 | 7/1986 |
| DE | 37 34 009 A1 | 10/1987 |
| DE | G 84 11 960.8 | 8/1988 |
| DE | 39 34 535 A1 | 5/1991 |
| DE | 40 18 943 A1 | 12/1991 |
| DE | 41 02 306 A1 | 8/1992 |
| DE | 42 05 283 A1 | 8/1993 |
| DE | 42 19 583 A1 | 12/1993 |
| DE | 43 08 888 A1 | 7/1994 |
| DE | 295 20 864 U1 | 5/1996 |
| DE | 197 45 167 A1 | 6/1998 |
| DE | 198 20 192 A1 | 11/1998 |
| EP | 0 458 115 A1 | 5/1991 |
| EP | 0 607 154 B1 | 7/1992 |
| EP | 0 900 328 B1 | 11/2002 |
| FR | 1063612 | 12/1953 |
| FR | 2 067 119 | 8/1971 |

| | | |
|---|---|---|
| FR | 2 609 154 | 7/1988 |
| FR | 2 721 982 | 6/1994 |
| GB | 395374 | 7/1933 |
| GB | 675161 | 7/1952 |
| GB | 689484 | 3/1953 |
| GB | 704002 | 2/1954 |
| GB | 892962 | 4/1962 |
| IT | 500313 | 11/1954 |
| JP | 55037540 | 3/1980 |
| JP | 58-25556 | 8/1981 |
| JP | 56-133597 | 10/1981 |
| JP | 58117995 | 7/1983 |
| JP | 61128024 | 6/1986 |
| JP | 63068759 | 3/1988 |
| JP | 02021123 | 1/1990 |
| JP | 02091463 | 3/1990 |
| JP | 02256856 | 10/1990 |
| JP | 03009058 | 1/1991 |
| JP | 04347410 | 12/1992 |
| JP | 07151402 | 6/1995 |
| JP | 07293334 | 11/1995 |
| JP | 09015197 | 1/1997 |
| WO | WO 90/08891 | 8/1990 |
| WO | WO 91/05949 | 5/1991 |
| WO | WO 99/40310 | 12/1999 |
| WO | WO 00/79114 A1 | 12/2000 |
| WO | 01/65100 A2 | 9/2001 |

OTHER PUBLICATIONS

Hargreaves, The Regenerator:, *The Phillip's Stirling Engine*, 1991, 9 pages.

*AAVID Thermal Technologies, Inc.*, Product Selection Guide, Jan. 1996, 4 pages.

Fleming, et al, *Rapid Recharge Capability of Valve Regulated Lead Acid Batteries for EV & HEV Applications*, 9 pages.

Anderson, et al., The Effects of APU Characteristics on the Design of Hybrid Control Strategies for Hybrid Electric Vehicles, *SAE Technical Paper Series*, Feb. 27-Mar. 2, 1995, pp. 67-71.

Dickinson, et al., Performance, Management and Testing Requirement for Hybrid Electric Vehicle Batteries, *SAE Technical Paper Series*, Aug. 11-13, 1998, 11 pages.

Hochgraf, et al., Engine Control Strategy for a Series Hybrid Electric Vehicle Incorporating Load-Leveling and Computer Controlled Energy Management, *SAE Technical Paper Series*, Feb. 26-29, 1996, pp. 11-24.

Oman, H., New Energy Management Technology Gives Hybrid Cars Long Battery Life, *SAE Technical Paper Series*, Aug. 2-5, 1999, 8 pages.

Hobbs, R., Development of Optimized Fast Charge Algorithms for Lead Acid Batteries, *SAE Technical Paper Series*, Mar. 1-4, 1999, 9 pages.

Wiegman, H., Battery State Control Techniques for Charge Sustaining Applications, *SAE Technical Paper Series*, Feb. 23-26, 1998, pp. 65-75.

\* cited by examiner

US 7,654,084 B2

METERING FUEL PUMP

The present application is a continuation of U.S. patent application Ser. No. 10/643,147, filed on Aug. 8, 2003 which is a continuation-in-part of U.S. patent application Ser. No. 09/853,239, filed May 11, 2001, which is a continuation-in-part of U.S. patent application Ser. No. 09/517,686, filed Mar. 2, 2000. The present application is also a continuation-in-part of U.S. patent application Ser. No. 10/361,354, filed Feb. 10, 2003, which is a divisional application of U.S. patent application Ser. No. 09/883,077, filed Jun. 15, 2001. All of the preceding applications are incorporated herein by reference in their entirety.

TECHNICAL FIELD

The present invention relates to metering fuel pumps for pressurized combustion chambers.

BACKGROUND

Engine burner, such as those used in Stirling engines, have one or more heat exchangers that produce significant back pressure at the air and fuel injection points. This back pressure can exceed 0.5 pounds per square inch gauge ("PSIG"). Gaseous fuels in most buildings and homes are supplied at pressures well below 0.5 PSIG. A fuel pump in the gas supply train may be used to raise the fuel pressure high enough to allow efficient mixing with of fuel with air. Prior art engines include some type of valve or throttle plate or other restrictive device to meter fuel into a combustion chamber. This restrictive device adds to the parts count and complexity for these engines. Elimination of such restrictive devices would simplify engine design.

SUMMARY OF THE INVENTION

In an embodiment of the present invention, there is provided a system for controlling the flow of a gaseous fuel from a fuel supply into a pressurized combustion chamber. The system includes a pump whose inlet is connected to a fuel supply. The pump outlet is connected to the combustion chamber. A chamber controller signal modulates the pump's action to control the fuel flow to the chamber. The controller signal may be based on a sensor that monitors an operating parameter of the system containing the chamber. The controller can, for example, maintain a head temperature constant, where the pressurized chamber is part of an external combustion engine. The controller may also maintain a fuel/air mixture ratio for the burner at a constant value. The pump may be a piston pump or a diaphragm pump driven by linear motors. The pump may also be a rotary pump such as a vane pump or a crank-driven diaphragm pump. The controller signal may be an alternating current signal that varies in amplitude to control the fuel flow. Alternatively, the controller signal may be a pulse-width-modulated direct current signal. The signal duration or frequency or both may be varied to control the fuel flow to the chamber. Alternatively, the controller signal may control the speed of a rotary pump. The speed of the rotary pump may be actively controlled using a speed sensor, tachometer or the back-EMF on the windings.

The system may be used advantageously to both control the fuel flow and increase the pressure of the gas supplied to the combustion chamber. The system advantageously eliminates the throttle plate or valve or other restrictive device that is used to control the flow of fuel to the chamber in prior art systems.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The fuel flow to a pressurized combustion chamber may be metered by varying the operating parameters of a fuel pump. Desired performance may be achieved without the throttle plates or valves or other restrictive devices that are normally used to meter the fuel flow to the combustion chamber.

Figure 1:
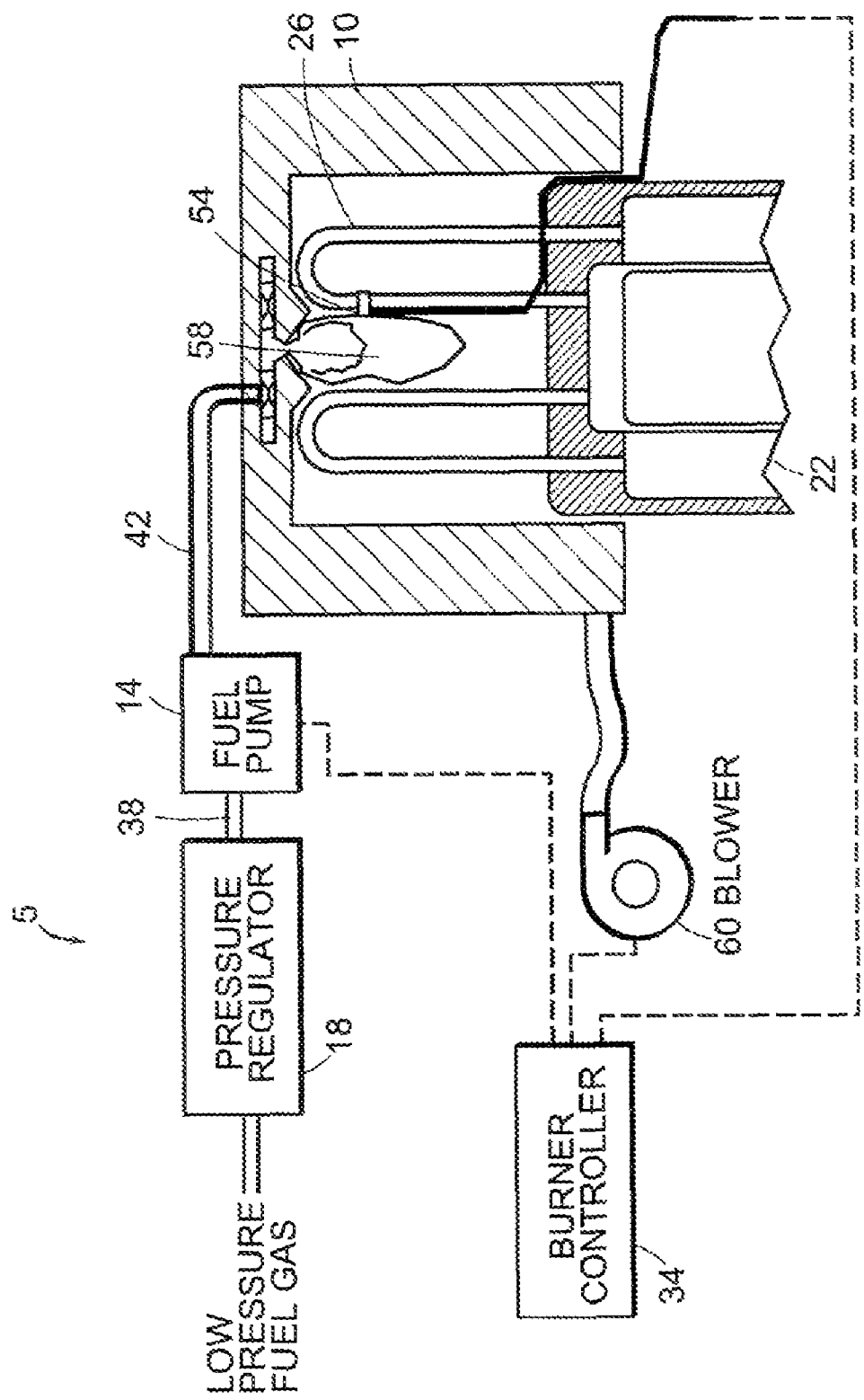
FIG. 1 is a block diagram showing a system for controlling a pressurized combustion chamber of an engine according to an embodiment of the present invention.

FIG. 1 shows a metering pump system providing gaseous fuel to a pressurized combustion chamber 58 of an engine 22 according to an embodiment of the invention. A gas train, labeled generally as 5, includes a fuel pump 14, interconnecting lines 38, 42 and may include a pressure regulator 18. The fuel pump 14 raises the fuel pressure in line 38 to a higher pressure in line 42. The gas train delivers fuel from the gas supply to the burner 10, where it is mixed with air and burned in a combustion chamber 58. The fuel pump is controlled by a controller 34 that modulates the fuel flow rate by varying one or more parameters of an electrical signal sent to the fuel pump 14. The controller may also regulate a blower 60 that provides air to the combustion chamber 58 and may receive signals from sensors that report engine-operating parameters.

In an embodiment of the invention, the delivered fuel pressure in line 38 is 6 to 13 inches water column for liquefied petroleum gas. Natural gas may be supplied in line 38 at even lower pressures of 3 to 8 inches water column. Alternatively, pressure regulator 18 can supply the fuel at lower pressures, even negative pressures. Typical fuel pressures in line 42 may range from 0.5 to 5 PSIG.

Figure 2:
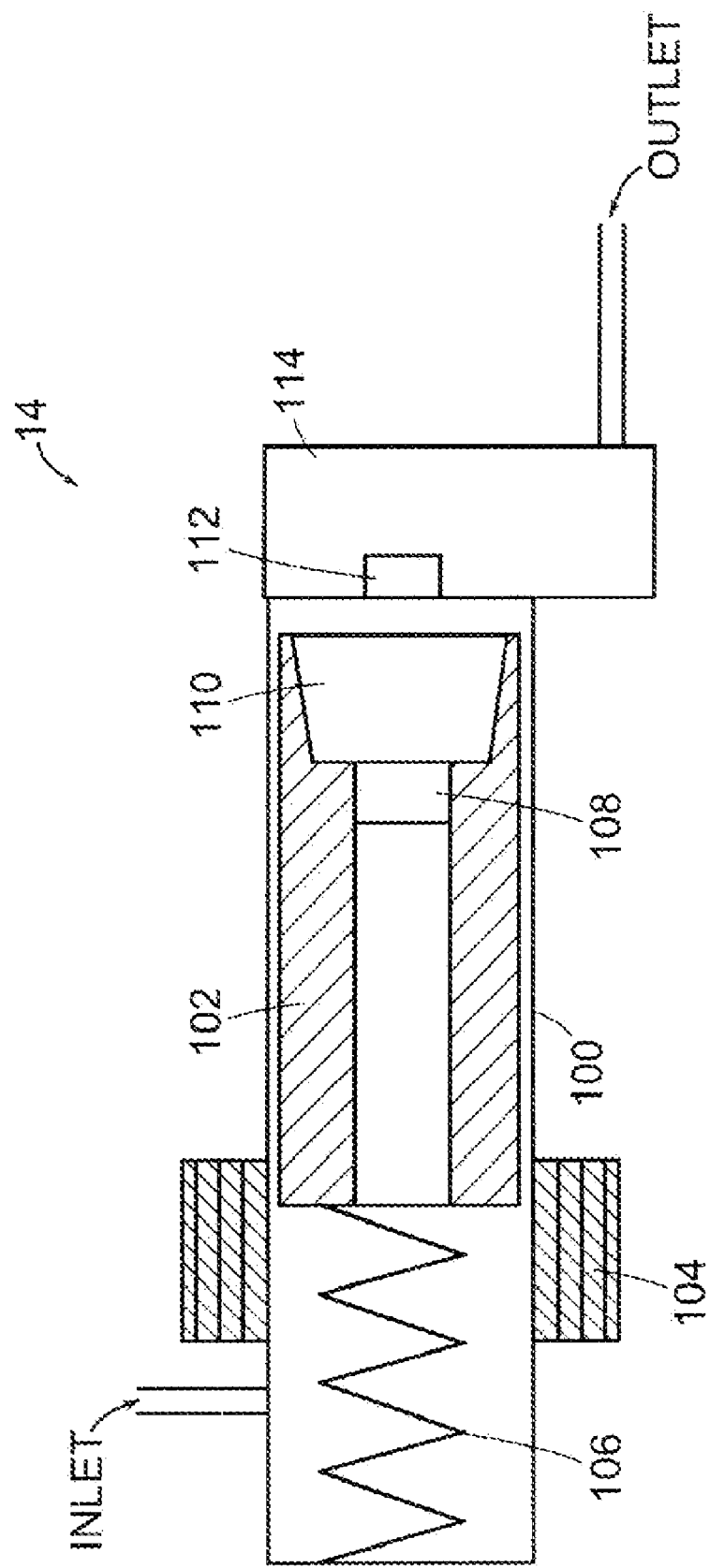
FIG. 2 shows a piston pump according to an embodiment of the invention.

In a preferred embodiment of the invention, fuel pump 14 is a linear piston pump. A linear piston pump is shown in FIG. 2. The pump includes a cylinder 100, a piston 102, a winding 104, a spring 106 and check valves 108, 112. When an electrical signal is applied to winding 104, the winding pulls the ferrous metal piston 102 to the left, compressing the spring 106. Check valve 108 in the piston allows fuel to flow into compression volume 110. When the electrical signal is turned off and the electromagnetic force on the piston begins to decrease, the piston 102 is forced to the right by the spring 106. Gas is forced out check valve 112 into the receiver volume 114 at a higher pressure.

Figure 3:
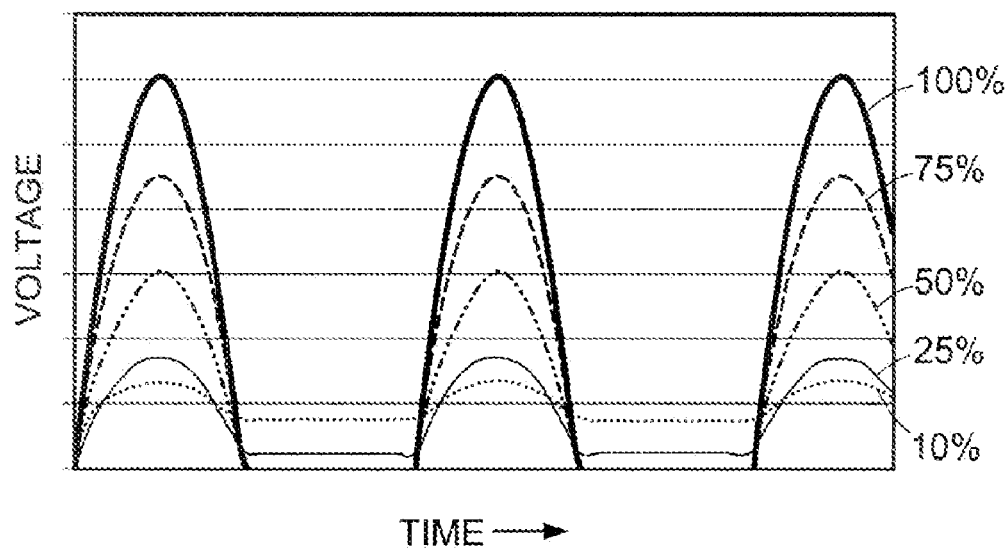
FIG. 3 shows an alternating current waveform suitable for driving the piston pump of FIG. 2.

The flow rate of the pump can be modulated by varying the stroke of the piston 102. In one embodiment of the invention, the signal from the controller to the pump is a half-wave alternating current ("AC") signal, as shown in FIG. 3. Circuitry to produce this signal is well known in the art. The piston stroke and, thus, the flow rate increases as the amplitude of the AC signal increases. In a preferred embodiment of the invention, low amplitude signals are biased slightly higher to improve repeatability and linearity of flow versus the driving signal. The force applied to the piston 102 by the windings 104 is inversely proportional to the distance from the windings to the piston. At low signal levels, the piston does not get very close to the windings and small changes in the friction and inertia of the piston will produce significant changes in the resulting piston stroke and flow. A bias voltage is applied to bring the resting-position of the piston closer to the windings, so that small changes in the controller signal that drives the piston dominate the frictional forces and the inertia of the piston. For example, the bias voltage added to the signal is highest at the lowest driving signal (10% signal in FIG. 3) and may drop to zero before the drive signal reaches 50%. The bias is reduced at higher flow levels to take advantage of the full pump stroke.

Figure 4:
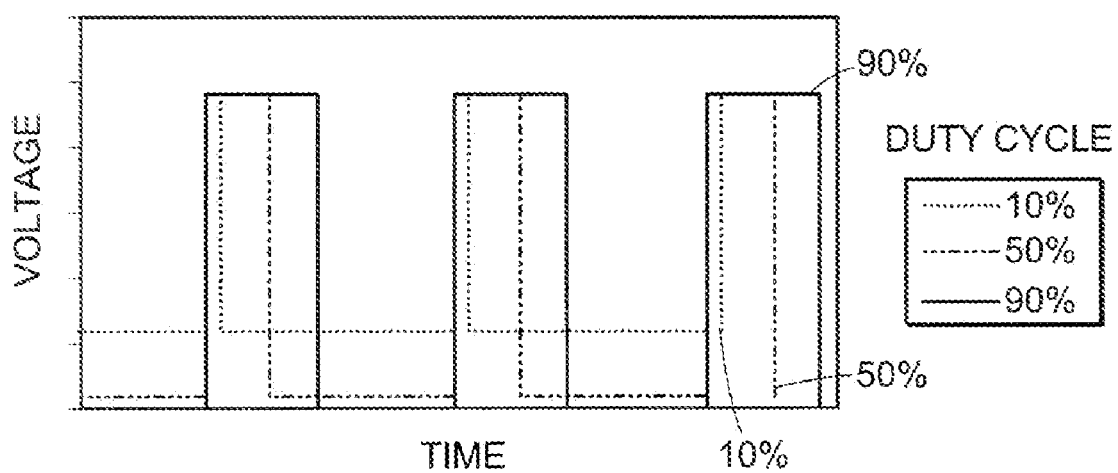
FIG. 4 shows a pulse-width-modulated direct current waveform suitable for driving the piston pump of FIG. 2, according to an embodiment of the present invention.

In another embodiment of the invention, the controller signal that drives the pump is a pulse-width-modulated ("PWM") direct current ("DC") voltage signal. FIG. 4 shows an exemplary DC waveform that may be used to drive the pump. Circuitry to generate the PWM DC signal in FIG. 4 is well known in the art. Three different drive signals are plotted versus time. These signal modulations correspond to 10%, 50% and 90% duty cycles, which are shown for purposes of illustration and not for limitation. Applying the rectangular wave voltages of FIG. 4 to the windings 104 of FIG. 2 will cause the piston 102 to move to the left and compress the spring 106. The stroke and, therefore, the flow will be roughly proportional to the voltage times the duration of the signal. The lower signals, 10% and 50%, include bias voltages between signal pulses. As in the case of the AC drive signal, the bias voltage moves the piston closer to the windings to provide greater piston response to small changes in the signal and overcome the frictional and inertia forces of the piston. This bias voltage may be varied with the duration of the drive signal. The bias voltage is highest at the minimum drive signal duration and may drop to zero before the drive voltage pulse duty cycle reaches 50%.

Other embodiments of the invention may use different controller signal waveforms to drive the piston. Use of all such controller waveforms is within the scope of the present invention as defined in the appended claims. In another embodiment of the invention, the piston pump of FIG. 2 can be driven without the bias voltages shown in FIGS. 3 and 4.

In another embodiment of the invention, both the frequency and the duration of the PWM DC controller signal modulating the pump can be varied to linearize the flow through the pump with changes in the driving signal.

Figure 5:
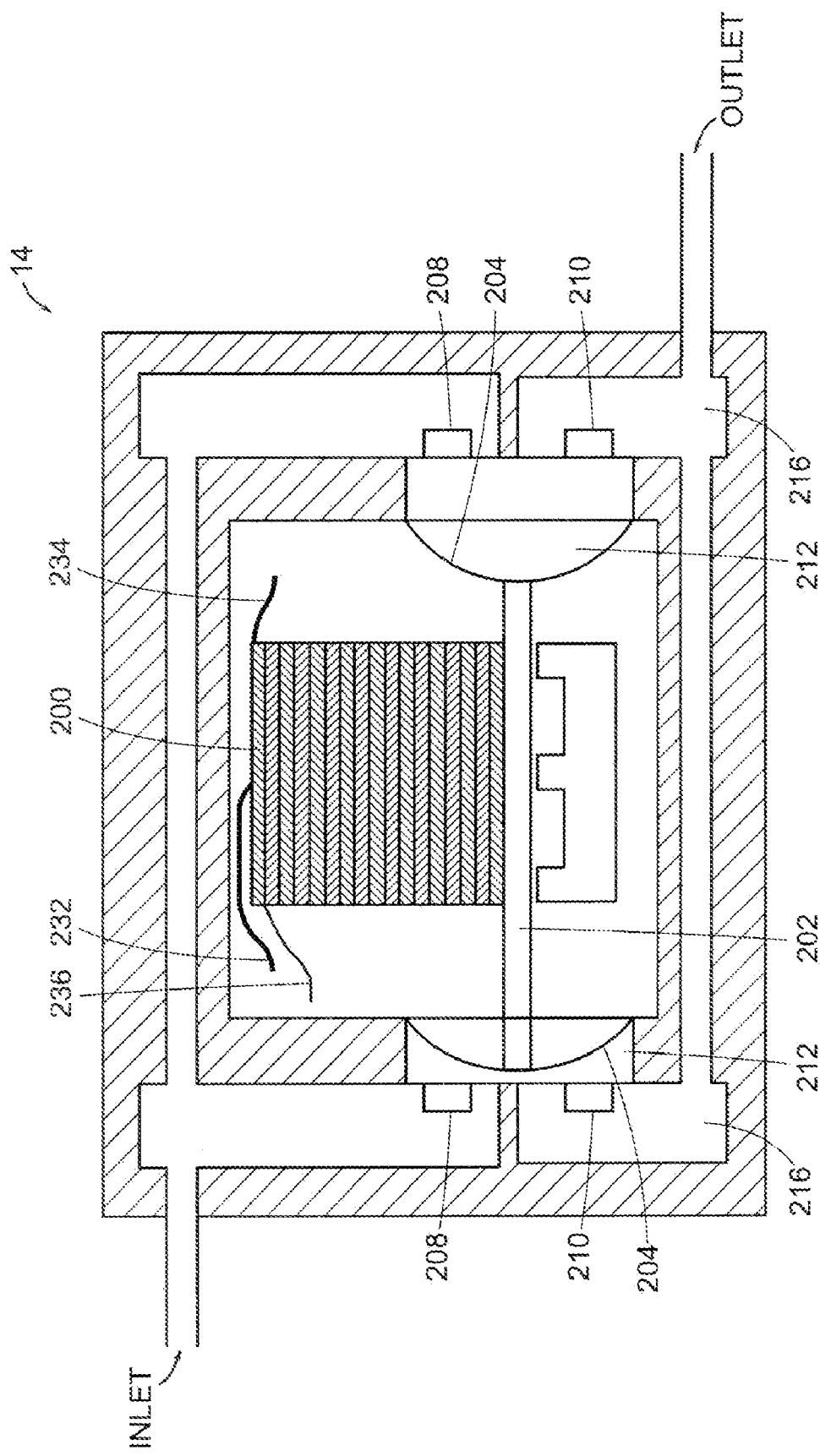
FIG. 5 is schematic diagram of a diaphragm pump according to an embodiment of the present invention.

In a further embodiment of the invention, pump 14 is a diaphragm pump as shown in FIG. 5. In the diaphragm pump, one or more solenoidal coils 200 drive the shaft of the pump 202 back and forth. The shaft 202 deflects two diaphragms 204 that alternatively pull gas into the chambers 212 and then expel it. The two wire coil is driven with an AC signal connected to wires (234, 236) that drives the piston 202 back and forth by reversing the flow of current through the coil 200. The solenoid has a permanent magnet so that a reversing magnetic field can drive the solenoid in opposite directions. The pumping force on the two chambers 212 is phased 180 degrees apart so that as one chamber is filled, the companion chamber is emptied. Check valves 208 upstream of the pumping chamber 212 allow gas flow in, while the downstream valves 210 allow flow out of the chambers and into the receiver volume 216. The solenoidal coil 200 can be driven with a full wave AC signal. In similar fashion to the piston pump, varying the amplitude of the AC signal will vary the stroke and, therefore, the fuel flow through the diaphragm pump.

In another embodiment of the invention, the electrical coil 200 in the diaphragm pump 14 of FIG. 5 can be center-taped by adding a third wire 232 to the center of the coil 200. Wires (234 & 236) connect to each end of the coil. This three wire connection allows the piston 202 to be driven back and forth with a DC source. The DC source connects to the center wire 232 and the other connecting wires (234 & 236) are alternatively connected to ground or a negative voltage, causing current to flow in one half-coil or the other.

Figure 6:
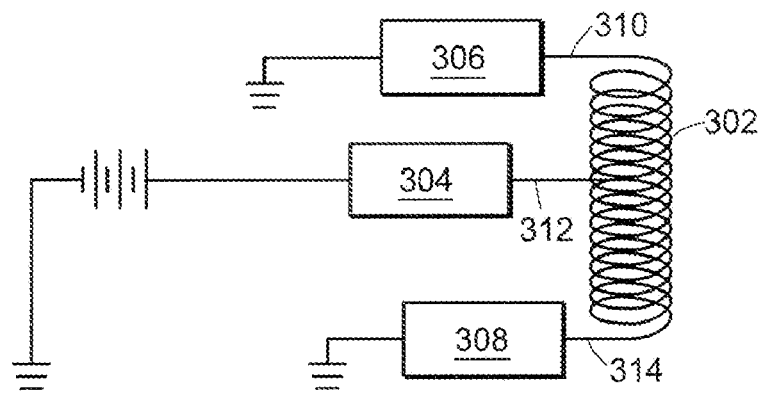
FIG. 6 is a schematic diagram of a center-tapped coil for a diaphragm pump according to an embodiment of the present invention.
Figure 7A:
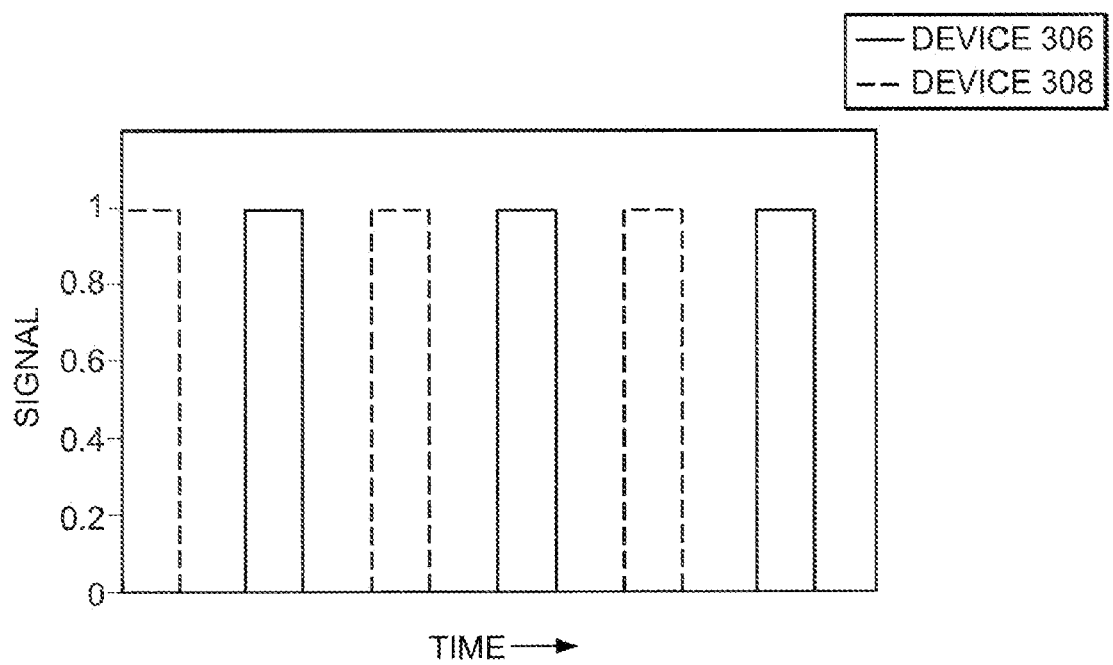
FIGS. 7A-B shows pulse-width-modulated direct current waveforms suitable for driving the center-tapped coil of FIG. 6, according to embodiments of the present invention.

A three-wire coil 302 and devices (304, 306, 308) to control the DC current flow to the coil are shown schematically in FIG. 6. The coil may be used to drive a diaphragm pump solenoid, as in FIG. 5. Devices (304, 306, 308) may be relays, field effect transistors ("FET"), bipolar transistors or other similar devices. The controller can vary the flow of fuel through the diaphragm pump by varying the amplitude of applied DC voltage signal 312 using device 304. Devices 306, 308 can be driven as shown in FIG. 7A, where first one device is closed, then opened and then the other device is closed and then opened. The vertical axis of the figure corresponds to a normalized driving voltage, where a signal equal to "1" means a device is closed (i.e., shorted). Control strategies using PWM signals, as illustrated in FIG. 4, albeit without the bias described previously for the piston pump and with suitable phasing, can be applied to each of devices 306, 308 in FIG. 6.

Figure 7B:
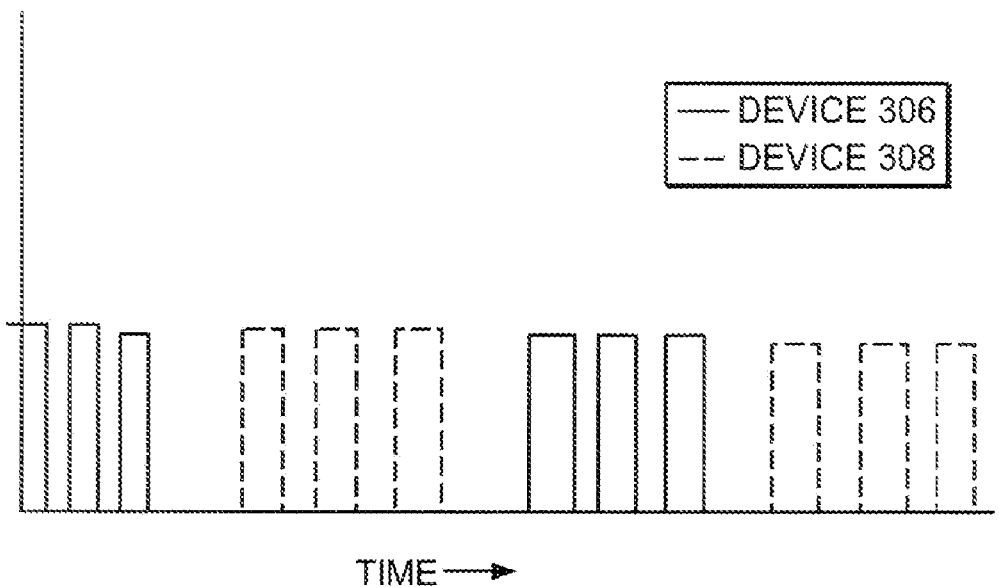

In another embodiment of the invention, the amplitude and frequency of the diaphragm pump stroke of FIG. 5 can be controlled using the three devices (302, 304, 306) shown in FIG. 6. The amplitude of the pump stroke is controlled by the average voltage at wire 312. This voltage can be modulated by fast pulse-width-modulating device 304. The stroke frequency may be controlled as before by devices 306 and 308. Alternatively, device 304 can be eliminated and switches 306 and 308 can be pulse-width modulated at a high frequency during their "on" state, as illustrated in FIG. 7B. In other embodiments of the invention, the center-tapped coil can be replaced by a full bridge or a half-bridge, as known to those skilled in the art.

Figure 8B:
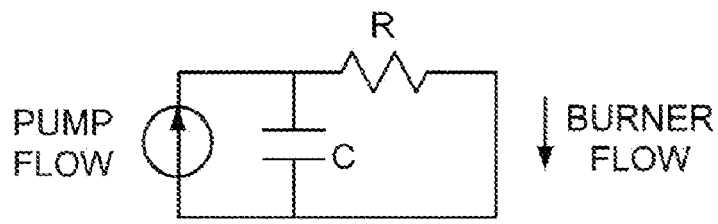
FIGS. 8A-8D show embodiments of the invention that include a filter between fuel pump and combustion chamber.
Figure 8D:
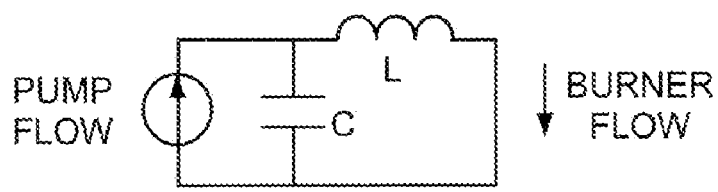
Figure 8A:
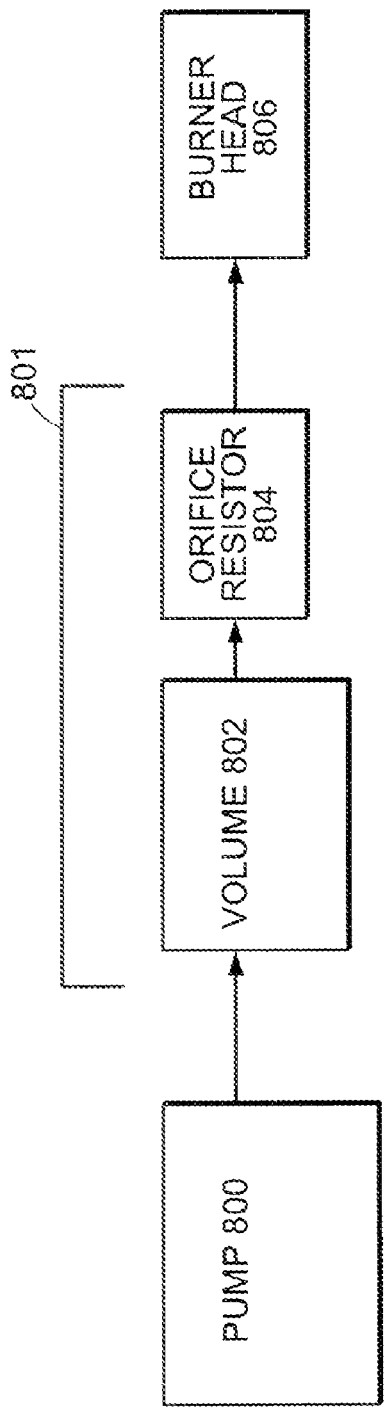

In other embodiments of the invention, for use in applications where a constant flow of fuel is important, a filter 801 may be added between pump 800 and burner head 806, where the fuel is mixed with the combustion air, as shown in FIG. 8A. One embodiment of the filter 801 is an RC filter comprising a capacitance (volume) 802 and an orifice 804. The volume and orifice are sized to allow the required fuel flow and reduce fluctuations in flow to a desired level. Mathematical techniques that are well known in the art may be used to determine these filter parameters.

An acoustic filter using a volume and an orifice restrictor has the electrical circuit analog shown in FIG. 8B. The analog of gas flow is electrical current, the analog of gas pressure is electrical voltage, the analog of volume is electrical capacitance, the analog of flow resistance is electrical resistance and the analog of gas inertia is electrical inductance. The orifice restrictor does not translate directly into this model because the orifice flow resistance is proportional to the gas flow squared (non-linear) instead of being proportional to the gas flow as the model suggests. The model can be used through the process of linearization of flow resistance for small signals. The pump gas flow ripple is attenuated by the factor of $1/(1+2\pi fRC)$. Where "f" is the frequency component of the gas flow entering the filter from the pump. Due to the orifice restrictor non-linear characteristics, the acoustic filter has a lower attenuation at low flow causing a high burner flow ripple as a percentage of average flow. The higher ripple can cause flame instability and higher emissions of pollutants. This non-linearity also causes a high resistance to average gas flow at the higher flow rates reducing the pump maximum flow capability.

Figure 8C:
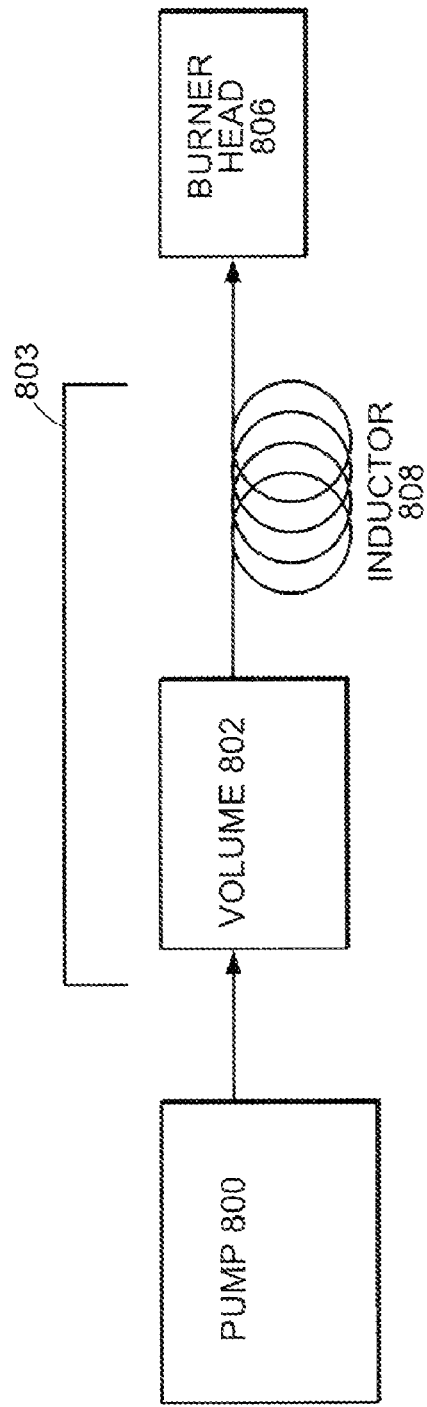

The addition of a long thin tube to the acoustic filter provides ripple attenuation through the gas mass acceleration, as shown in FIG. 8C. The diagram for the electrical analog is shown in FIG. 8D. The pump gas flow ripple is attenuated by the factor of $1/[1+(LC)(2\pi f)^2]$. Since L and C are not a function of flow, the filter attenuation is not affected by the flow rate and does not have the disadvantages of the filter of FIG. 8A. Attenuation of the ripple also increases the pump's flow rate.

Referring again to FIG. 1, in another embodiment of the present invention, controller 34 modulates the output of fuel pump 14 to control the temperature of the heater tubes 26 of the engine. The temperature of the heater tube 26 may be measured with a temperature sensor 54, such as a thermocouple, that is attached to a heater tube 26. When the engine increases speed, the engine draws more thermal energy from the heater tubes 26. The tubes cool and the thermocouple 54 reports this temperature drop to the controller 34, which in turn increases the fuel flow until the measured temperature is restored to a specified level. Any of the devices and methods for metering the fuel through the fuel pump, as described above, may be employed in this embodiment of the invention. Various fuel pump types including rotary vane pumps, piezoelectric pumps, crank driven piston pumps, etc., may be employed. In other embodiments of the invention, various operating parameters of a system, of which the pressurized chamber is a part, may be controlled by controlling the fuel pump to meter the fuel flow to the chamber. For example, the speed of an internal combustion engine or the power output of an engine may be determined by the controller. Alternatively, a fuel/air mixture ratio to a burner may be maintained by the controller.

The devices and methods described herein may be applied in other applications besides an engine, in terms of which the invention has been described. Any system which includes a pressurized combustion chamber may employ embodiments of the invention to control the flow of fuel and, thus, the rate of combustion. The described embodiments of the invention are intended to be merely exemplary and numerous variations and modifications will be apparent to those skilled in the art. All such variations and modifications are intended to be within the scope of the present invention as defined in the appended claims.

What is claimed is:

1. A pump system for controlling a flow of a gaseous fuel from a fuel supply into a pressurized combustion chamber of an external combustion engine, the system comprising:
   a. a pump, the pump having an inlet and an outlet, the inlet connected to the gaseous fuel supply, the gaseous fuel supply having a pressure, and the outlet connected to the combustion chamber of the external combustion engine, wherein the pump raises the pressure of the gaseous fuel whereby the pressure of the gaseous fuel is higher at the outlet; and
   b. a controller in signal communication with the pump, the controller modulating the pump with a control signal to control the flow of the gaseous fuel to the chamber.

2. A pump system according to claim 1, wherein the pump is a linear piston pump and the controller modulates the pump with a half wave alternating current control signal to control the flow to the chamber.

3. A pump system according to claim 2 wherein the amplitude of the control signal varies.

4. A pump system according to claim 2, wherein the control signal further includes a fixed direct current bias.

5. A pump system according to claim 2, wherein the control signal further includes a variable direct current bias.

6. A pump system according to claim 2, wherein the frequency of the control signal varies.

7. A pump system according to claim 1, wherein the pump is a linear piston pump and the controller modulates the pump with a pulse-width-modulated direct current control signal to control the flow to the chamber.

8. A pump system according to claim 7, wherein the control signal further includes a fixed direct current bias.

9. A pump system according to claim 7, wherein the control signal further includes a variable direct current bias.

10. A pump system according to claim 7, wherein the amplitude of the control signal varies.

11. A method for controlling a flow of a gaseous fuel from a fuel supply into a pressurized combustion chamber of an external combustion engine, the method comprising:
    a. providing a pump, the pump having an inlet and an outlet, the inlet connected to the gaseous fuel supply, the gaseous fuel supply having a pressure, and the outlet connected to the combustion chamber of the external combustion engine, wherein the pump raises the pressure of the gaseous fuel whereby the pressure of the gaseous fuel is higher at the outlet; and
    b. modulating the pump with a signal to control the flow to the chamber.

12. A method according to claim 11, wherein the pump is a linear piston pump, and modulating the pump includes modulating the pump with a half wave alternating current signal.

13. A method according to claim 12, wherein modulating the pump includes varying the amplitude of the signal.

14. A method according to claim 12, wherein modulating the pump includes applying a direct current bias to the signal.

15. A method according to claim 12, wherein modulating the pump includes varying a direct current bias for the signal.

16. A method according to claim 12, wherein modulating the pump includes varying the frequency of the signal.

17. A method according to claim 11, wherein the pump is a linear piston pump, and modulating the pump includes modulating the pump with a pulse-width-modulated direct current signal.

18. A method according to claim 15, wherein modulating the pump further includes applying a direct current bias to the signal.

19. A method according to claim 15, wherein modulating the pump further includes varying a direct current bias for the signal.

20. A method according to claim 15, wherein modulating the pump further includes varying the amplitude of the signal.

* * * * *